United States Patent [19]
Kanzaki et al.

[11] Patent Number: 5,834,861
[45] Date of Patent: Nov. 10, 1998

[54] LSI FOR SIGNAL TRANSMISSION

[75] Inventors: Noboru Kanzaki; Yutaka Yoshida, both of Kanagawa, Japan

[73] Assignee: Fuji Electric Co., Ltd., Kanagawa, Japan

[21] Appl. No.: 305,674

[22] Filed: Sep. 14, 1994

[30] Foreign Application Priority Data

Sep. 16, 1993 [JP] Japan .................................. 5-230170

[51] Int. Cl.⁶ .................................................. H01H 83/00
[52] U.S. Cl. ........................ 307/125; 307/146; 257/208; 257/211; 375/260; 375/288; 379/90
[58] Field of Search ..................... 307/125, 116, 307/147; 375/257, 260, 286, 288; 379/90; 257/208, 211; 310/85.1

[56] References Cited

U.S. PATENT DOCUMENTS

| | | | |
|---|---|---|---|
| 4,964,140 | 10/1990 | Yonekura | 375/36 |
| 5,019,814 | 5/1991 | Biggs et al. | 340/870.29 |
| 5,214,318 | 5/1993 | Nakanishi et al. | 326/124 |
| 5,307,340 | 4/1994 | Inoue et al. | 370/13 |
| 5,444,740 | 8/1995 | Mizukami et al. | 375/286 |
| 5,448,231 | 9/1995 | Takezoe | 340/870.39 |

FOREIGN PATENT DOCUMENTS 5-41709   2/1993   Japan .

OTHER PUBLICATIONS

"Guidelines For Physical Layer Testing Low Speed, Voltage Mode", International FieldBus Consortium, Document ID No. IFC 910425 28, 1991.

"Proposal Of New Signal Transmitting System For Field Bus", ISA SP50 & IEC SC65C WG6 Joint Committee, Fuji Electric Co., Ltd., Nov. 1992 and Minutes, ISA/SP50–1992–473, Nov. 1992.

*Primary Examiner*—David S. Martin
*Assistant Examiner*—Albert W. Paladini
*Attorney, Agent, or Firm*—Finnegan, Henderson, Farabow, Garrett & Dunner, L.L.P.

[57] ABSTRACT

A large scale integrated circuit has a first circuit section with input terminals external of the integrated circuit connected to output terminals of a second portion of the integrated circuit for use in an environment not requiring intrinsic safety. When the circuit is to be installed in an environment requiring intrinsic safety the external connectors are disconnected from one another. An excess voltage suppression circuit is connected to the external connections of the second circuit section.

7 Claims, 6 Drawing Sheets

LSI FOR SIGNAL TRANSMISSION

BACKGROUND OF THE INVENTION

1. Field of the Invention

The present invention relates to a large scale integrated circuit (LSI) which satisfies the condition of intrinsic safety-explosion proof (hereinafter referred to simply "intrinsic safety") in the field of industrial instrumentation, control, etc. and performs communication between terminals in such a manner that signals are superposed while power is directly supplied to the terminals connected to a transmission line. More particularly, the present invention relates to an LSI for signal transmission for preferable use in the communication standard "field bus" which is now being standardized by the organization such as the IEC (International Electrotechnical Commission).

2. Discussion of the Related Art

Figure 5:
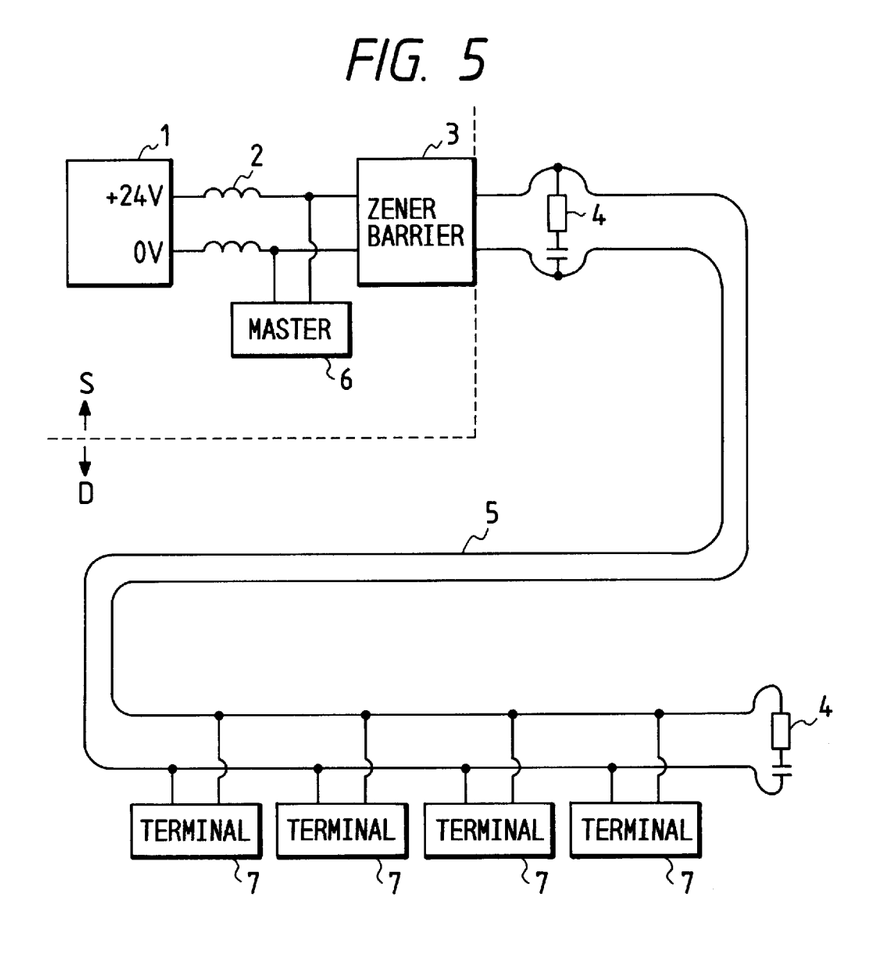
FIG. 5 is a schematic block diagram for explaining the prior art.

FIG. 5 is a view for explaining the gist of the system proposed previously (Japanese Patent Unexamined Publication (Laid-Open) No. 5-41709, hereinafter referred to as "proposed system") by Fuji Electric Company Ltd.

In FIG. 5, symbol D denotes a dangerous zone where explosive gas exists or there is danger of its presence; and symbol S denotes a safe zone where there is not such danger. In the intrinsic safety structure, in order to suppress the voltage and current flowing into the dangerous zone, a Zener barrier (hereinafter referred to as "barrier") is arranged at the boundary between the zones D and S.

Terminals 7 connected in parallel to a transmission line 5 composed of a pair of electrical wires are also connected to the other terminal (master) 6 through the barrier 3. To both ends of the transmission line 5, terminators 4 each composed of a resistor and a capacitor for D. C. cutting are connected. To the terminals 7, D.C. power is supplied from a bus power source 1 which is a constant power source through the barrier 3 and the transmission line 5. Inductors 2 are provided to separate this D.C. component and the A.C. component of the signal generated when the terminals communicate with each other. The terminal (master) 6 and the terminals 7 transmit a signal superposed on the D.C. current supplied from the bus power source 1.

Figure 6:
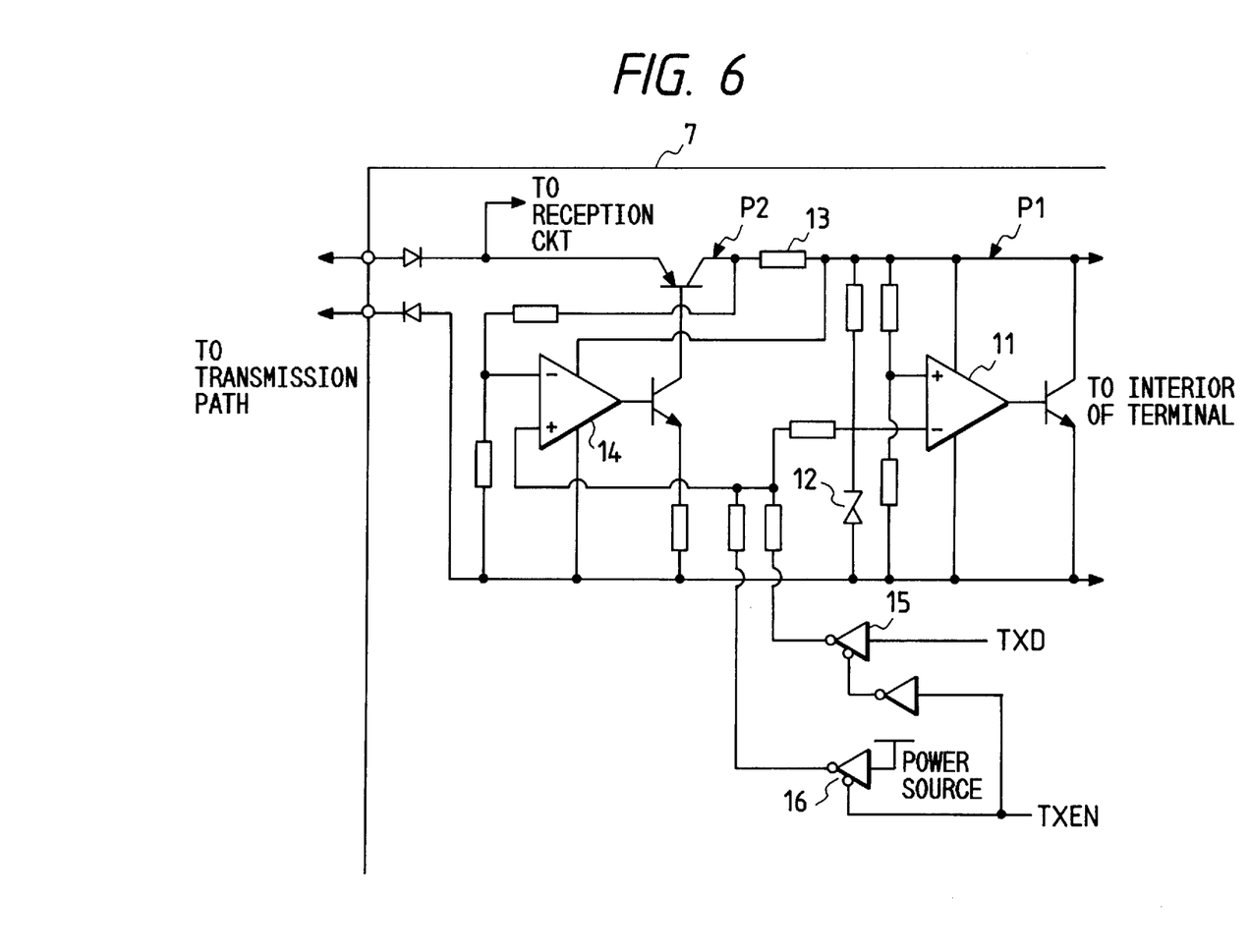
FIG. 6 is a circuit diagram showing a typical terminal shown in FIG. 5.

FIG. 6 shows an example of the terminal used in the proposed system (Japanese Patent Unexamined Publication No. Sho 5-41709).

In FIG. 6, reference numerals 11 and 14 denote operational amplifiers (OPEAMPs); 12 a voltage reference (IC circuit for developing an accurate constant voltage; 13 a resistor; and 15 and 16 denote tri-state gates. Symbol TXEN denotes a control signal which is at a high level (H) during transmission and a low level (L) during non-transmission, and symbol TXD denotes a data signal.

In FIG. 6, the voltage at point P1 is always stabilized into e.g. 4.0 V by a 2 V voltage reference 12 and an operational amplifier 11 using the constant voltage (2 V) as a reference voltage. The stabilized voltage is used as an internal power source for each terminal. The tri-state gate 16 receives a control signal as TXEN. When TXEN is "HI", the gate 16 falls into an high impedance (interruption) state, and when TXEN is "L", the gate 16 serves as a normal buffer. Likewise, a tri-state gate 15 receives the signal resulting from inversion of TXEN as a control signal. Then, when TXEN is "L", the gate 15 falls into the interruption state, and when it is "H", the gate 15 becomes "H"or "L" in accordance with a data signal (TXD).

Therefore, during signal non-transmission (when TXEN is "L"), the output from the tri-state gate 15 has a high impedance whereas the output from the tri-state gate 16 is "L". Thus, the reference voltage which stabilizes the voltage at point P2 into e.g. 4.4 V is supplied to the operational amplifier 14. Then, the current of 4 mA flows though the resistor of 100 Ω between points P1 and P2. As a result, the terminal pulls in the current of 4 mA.

On the other hand, during signal transmission, i.e. when TXEN is "H", the output from the tri-state gate 16 has the high impedance whereas the output from the tri-state gate becomes "H" or "L" in accordance with data signal (TXD). Thus, the reference voltage given to the operational amplifier 14 is swung centering the voltage of 2 V formed by the voltage reference 12. In accordance with the reference voltage, the operational amplifier 14 swings the voltage at P2 over 4.05–5.55 V. As a result, the terminal can pull in the current of 15 mApp (pp: peak-to-peak) centering 8 mA from the transmission line.

Meanwhile, the condition of the intrinsic safety at the terminal used in the dangerous zone D is that the relation between the voltage supplied to the terminal and the current flowing thereinto does not exceed the firing critical value of explosive gas due to electric spark. With the firing critical value, when the voltage supplied to the terminal is lower, the flowing current can be made larger. Further, when the voltage supplied to the terminal is lower, the inductance or capacitance which serves as an energy source within the terminal when viewed from a transmission line can be used to its larger value. This makes the internal circuit design easy.

In order to realize the intrinsic safety at the terminal supplied with power from the transmission line, the power supply circuit constituting a power source from the transmission line is composed of discrete components. Further, an excess voltage suppressing circuit including a Zener diode is connected to the output terminal of the power supply circuit, i.e. the input terminal of supplying the internal power at the terminal. Then, in accordance with the voltage defined by the excess voltage suppressing circuit, the intrinsic safety condition can be designed by the current flowing into the internal circuit at the terminal and the inductance or capacitance viewed from the transmission line.

On the other hand, when the power supply circuit is LSI-ed, because the requirement of the intrinsic safety, the designing condition of the LSI will be defined as a failure mode. Therefore, the LSI must be designed under the condition that the voltage from the transmission line is applied to the internal circuit in the terminal as it is. Thus, when the voltage on the transmission line is high, it is impossible to increase the current flowing into the terminal or the inductance or capacitance viewed from the transmission line. This makes it difficult to increase the number of terminals which can be connected to the transmission line.

Low power consumption in the terminal internal circuit can be realized by a method in which the sleep-mode driving of stopping clocks for the processing circuit (CPU) used is performed to make intermittent control for CPU or reduce the speed of synchronizing clocks which are supplied to a logic circuit.

However, there is a problem that the conventional terminal is hard to realize its LSI and satisfy the condition of intrinsic safety. Therefore, the problem for the present invention is to provide an LSI for signal transmission which can easily satisfy the intrinsic safety condition and can also serve as a circuit requiring the intrinsic safety condition.

Further, there is the following problem. In the method of performing the sleep mode driving to make an intermittent operation of CPU, it takes several tens ms until stable oscillation of clocks. This retards the operation response. On the other hand, in the method of reducing the speed of synchronizing clocks, the logic circuit cannot follow high speed transmission signals.

SUMMARY OF THE INVENTION

An object of the present invention is to provide a terminal free from such a problem and particularly to realize the low power consumption.

In order to solve such a problem, in the present invention, an LSI for signal transmission in which while power is supplied to plural terminals, signals are transmitted to each of the plural terminals connected in a multi-drop manner through a transmission line is characterized by a first circuit section composed of a rectifier for rectifying a power source inputted from a first external terminal and a semiconductor switch for on-off controlling the output therefrom and having a second external terminal for inputting the control signal for the semiconductor switch and a third external terminal which serves as an output terminal of the semiconductor switch; and a second circuit section having two voltage stabilizing circuits in which the stabilizing power output from the first voltage stabilizing circuit is extracted out as an external terminal potential through a resistor, to the one input terminal of the second voltage stabilizing circuit, the potential resulting from resistance-division of said external terminal potential is supplied while to the other terminal thereof, an output is received from the circuit for transmitting the transmission signal, and the output terminal from said second voltage stabilizing circuit serves as an external terminal; wherein in an intrinsic safety-explosion proof structure, an excess voltage suppressing circuit is connected to the front stage of said second circuit section.

Further, in the invention, an LSI for signal transmission in which while power is supplied to plural terminals, signals are transmitted to each of the plural terminals connected in a multi-drop manner through a transmission line, is characterized by a signal reception circuit section for receiving a transmitted signal to be binary-digitized; a gate circuit section for storing the outputs from the signal reception circuit and supplying a clock signal to a logic circuit and a processing circuit only when the stored value exceeds a predetermined level, wherein the clock signal is supplied to the logic circuit and processing circuit only when the transmitted signal is received.

The interior of an LSI for transmission is formed into a separation structure composed of a first circuit section requiring withstand voltage protection and a second circuit section requiring no withstand voltage protection. The output terminal for the first circuit section and input terminal for the second circuit section are provided as external terminals, respectively. Where intrinsic safety is required, the above external terminals are directly connected outside the LSI. Where intrinsic safety is not required, an excess voltage stopping circuit composed of discrete components is connected instead of the first circuit section.

To the circuit for oscillating a clock signal, power is supplied simultaneously with connection of a transmission line. Therefore, after the oscillation circuit is placed on the transmission line, it is in a transmission state. Then, there is no delay time from the reception of a signal to stabilization of oscillation so that the signal reception cannot be started. In addition, before the received signal reaches, the clock from the transmission circuit is not supplied to the logic circuit or CPU in the terminal. Thus, low power consumption can be attained.

The above and further objects, features and advantages of the invention will appear more fully from the accompanying drawings and the following detailed description.

DETAILED DESCRIPTION OF THE PREFERRED EMBODIMENTS

Figure 1:
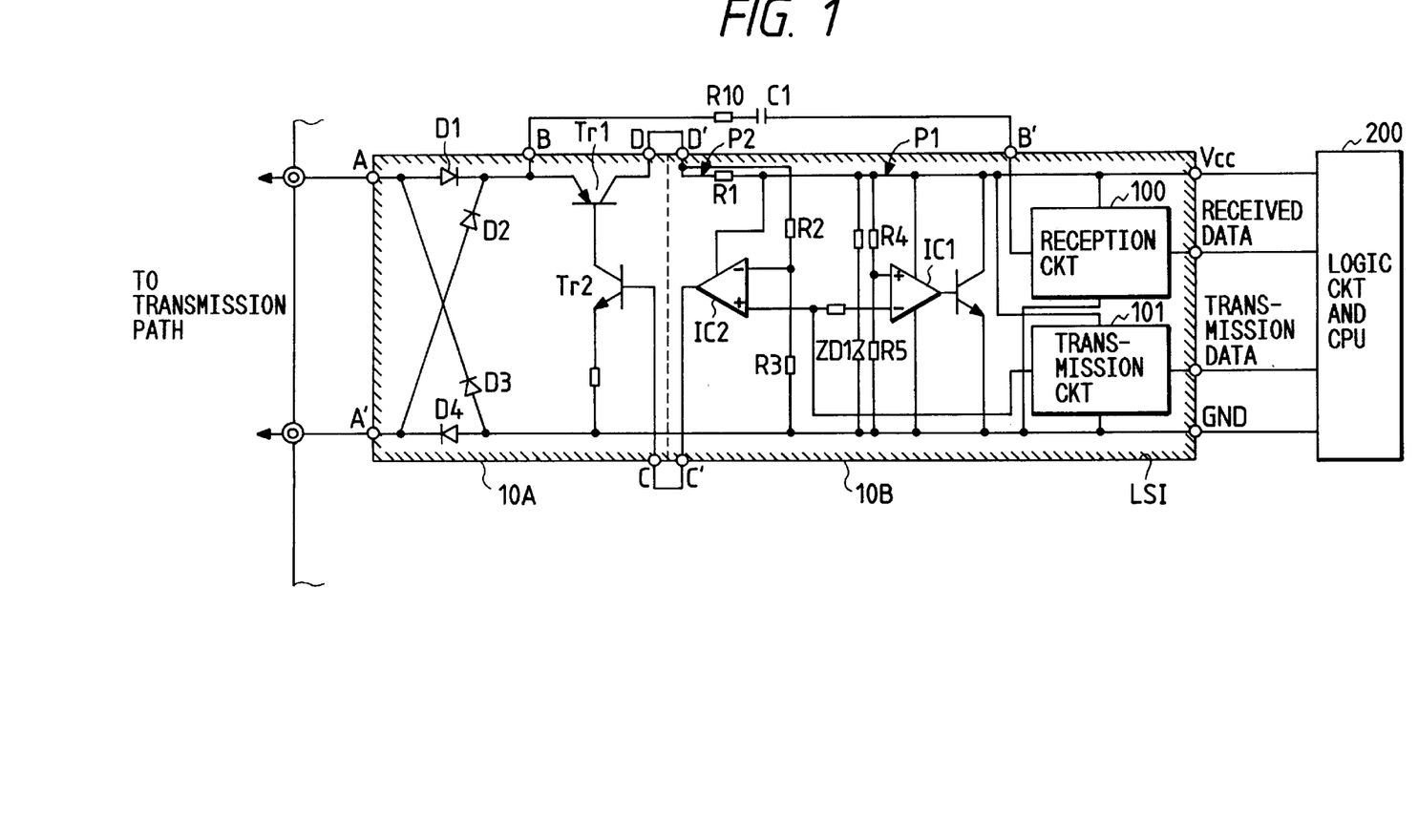
FIG. 1 is a circuit diagram showing an embodiment of the present invention where intrinsic safety is not executed.

FIG. 1 is a circuit diagram showing an embodiment of the present invention where the intrinsic safety is not required. In FIG. 1, symbols A and A' denote external terminals of an LSI connected to a transmission line. The power source supplied to the external terminals are rectified by a rectifier composed of D1 to D4. The rectified power source appears between terminal B and ground GND. Symbols Tr1 and Tr2 denote semiconductor switches which are controlled from terminal C. The output therefrom appears at the external terminal D of LSI. These components constitute a first circuit 10A.

Symbol IC2 denotes an operational amplifier as a second voltage stabilizing circuit. To an input terminal (−) thereof, a power source divided by resistors R1, R2 and R3 is connected whereas to another input terminal (+) thereof the output from a transmission circuit 101 is connected. Symbol IC1 denotes an operational amplifier as a first voltage stabilizing circuit. The potential at point P2 is stabilized so as to be e.g. 4.0 V by a voltage reference 12 and resistors R4 and R5. The operational amplifier IC1 supplies the power potential to a signal reception circuit 100 and a signal transmission circuit 101. These components constitute a second circuit section 10B. This second circuit section is basically the same as the circuit shown in FIG. 6. IC1 and IC2 correspond to reference numerals in FIG. 6, respectively, and a Zener diode ZD1 and resistor R1 correspond to reference numerals 12 and 13 in FIG. 6, respectively.

The potential at point P1 of the second circuit section is stabilized at a certain potential by the operational amplifier IC2 to which an output signal from the transmission circuit 101 is supplied. Specifically, since the operational amplifier IC2 is controlled by the "1" or "0" signal from the transmission circuit 101 and its output is connected to the potential of 4.0 V through a resistor R1, the current taken by the operational amplifier IC2 from the transmission line can be caused to correspond to the transmission signal "1" or "0". Now, since the intrinsic safety condition is not required, the first circuit section and the second circuit section are directly connected between their D–D' points, C–C' points and B–B' points outside the LSI. Incidentally, the route through which the received signal is taken from the transmission line is connected to a DC-current cutting capacitor C1 through a current limiting resistor R10.

Figure 2:
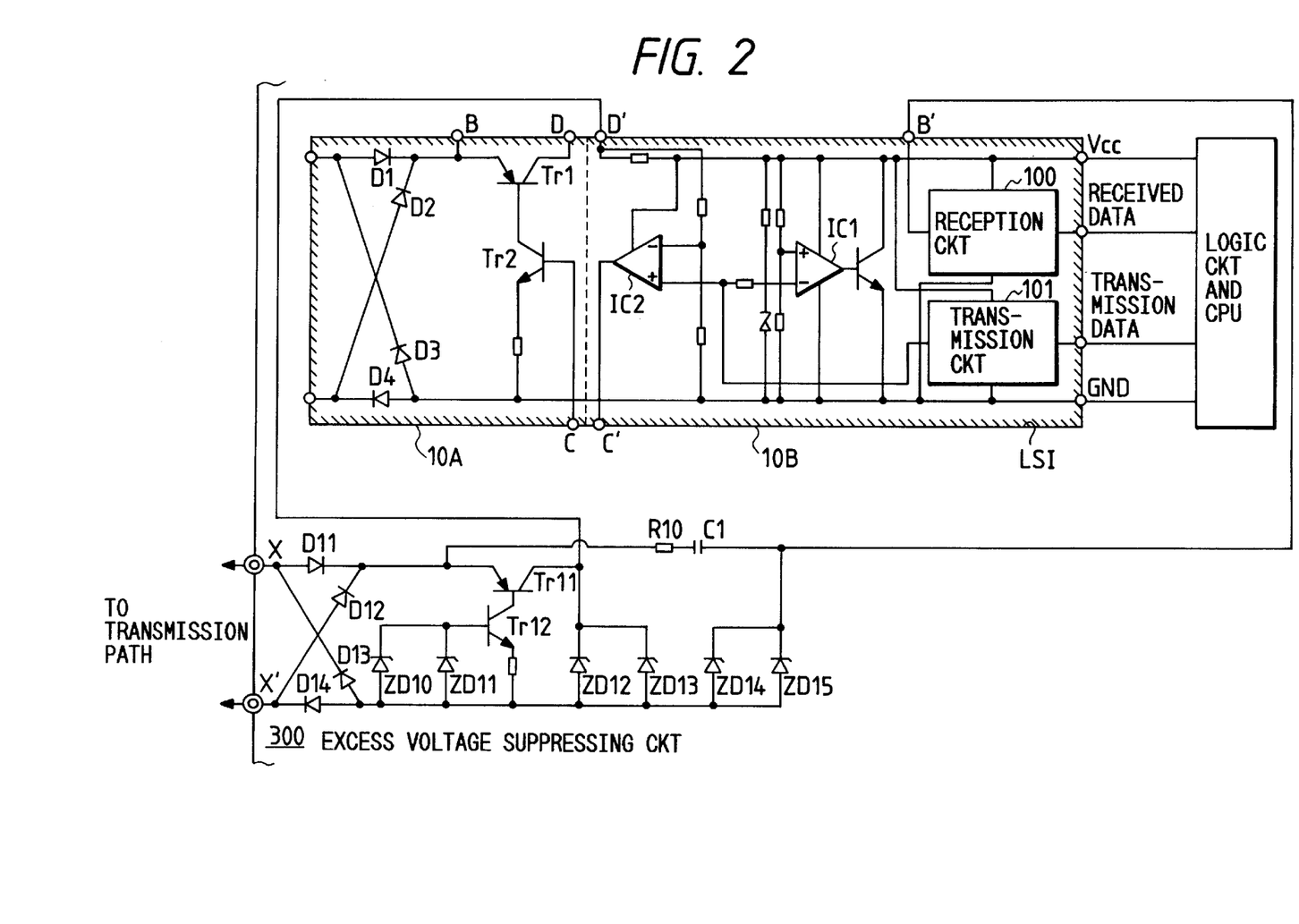
FIG. 2 is a circuit diagram showing the embodiment of the present invention where intrinsic safety is executed.

FIG. 2 is a circuit diagram showing a case to which the intrinsic safety condition is applied.

As seen from the figure, the transmission line is connected to an excess voltage suppressing circuit (terminals X and X') 300 composed of discrete components, the control terminals of semiconductor switches TR11 and TR12 are the output terminal C' of the operational amplifier IC2 and an excess voltage is suppressed by Zener diodes ZD10 and ZD11. The outputs from the semiconductor switches TR11 and TR12 are connected to the terminal D' and inputted to the second circuit section 10B while an excess voltage is suppressed by Zener diodes ZD12 and ZD13. Further, the terminal B' is connected to the signal receiving circuit while an excess voltage is restrained. Thus, restraint for an excess voltage for LSI is performed so that the intrinsic condition can be satisfied in such a manner that the internal circuit is designed with suppression voltages defined by Zener diodes ZD10–ZD15.

Figure 3:
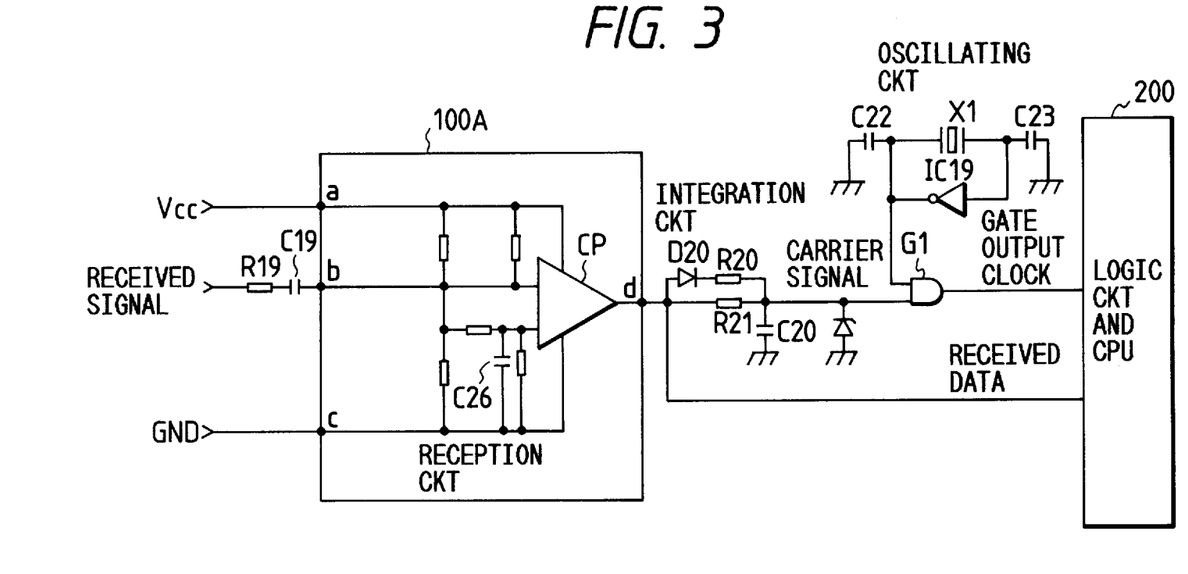
FIG. 3 is a circuit diagram showing another embodiment of the present invention.

FIG. 3 is a circuit diagram showing another embodiment according to the present invention. In this embodiment, a received signal is connected to point b of a signal reception circuit 100 A through a DC-current cutting capacitor C19 and a current limiting resistor R19. The received signal is digitized by a comparator CP and smoothed by a smoothing circuit including a capacitor C26. The resultant signal is supplied, as a carrier signal, to an integration circuit composed of resistors R20, R21, a diode D20, a capacitor C20, etc. The carrier signal is integrated in the integrating circuit and inputted to a gate G1. Only when the output from the integration circuit exceeds a predetermined value, the gate G1 having a predetermined threshold value supplies a clock signal from a signal oscillation circuit composed of an IC 19, a signal oscillation component X1 and capacitors C22 and C23, etc. to a logic-circuit/CPU unit 200.

FIGS. 4(a) to 4(d) show the waveforms at respective points in FIG. 3.

Figure 4A:
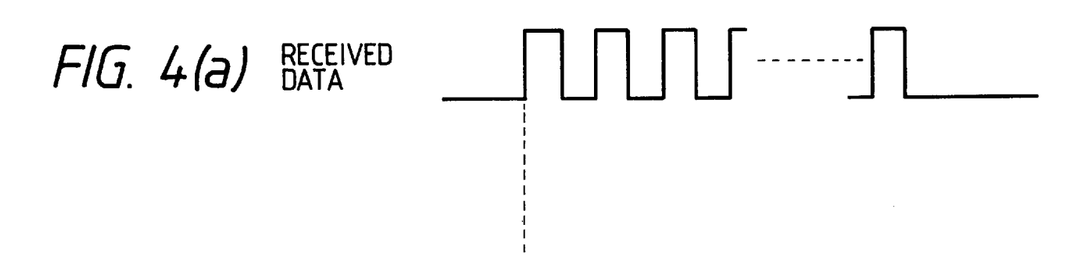
FIGS. 4(a) to 4(d) are waveform charts at respective points for explaining the operation of FIG. 3.
Figure 4B:
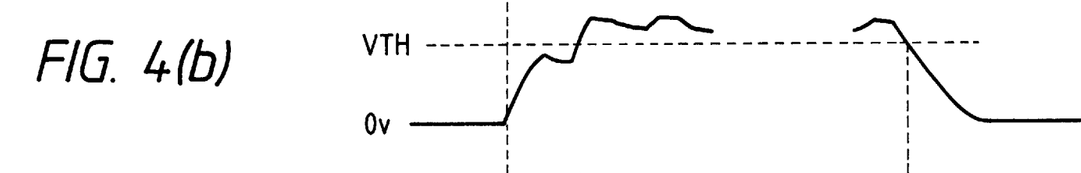
Figure 4C:
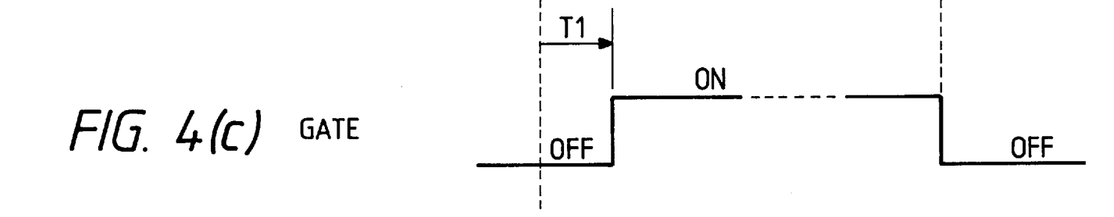
Figure 4D:
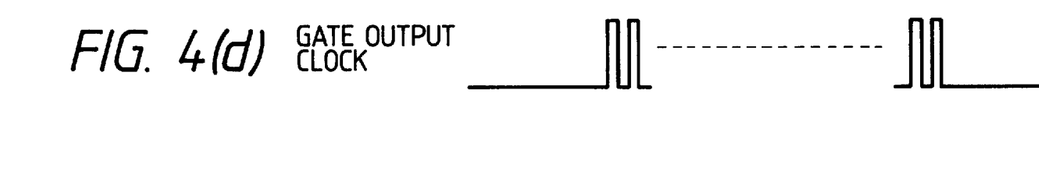

Now, it is assumed that the received data repeats the potentials of "L" and "H" as shown in FIG. 4(a). When the received signal shifts from "L" to "H", the carrier signal is charged with a time constant defined by parallel resistance of the resistors R20 and R21 in the integration circuit and the capacitor C20. On the other hand, when the received signal shifts from "H" to "L", the carrier signal is discharged with a time constant defined by the resistor R21 and capacitor C20. Thus, as seen from FIG. 4(b), the charging operation is quick and the discharging operation is slow. When the received signal repeats the potentials of "L" and "H" for a certain time, the gate G1 becomes "on" as shown in FIG. 4(c). Thus, as shown in FIG. 4(d), a clock signal from the oscillation circuit is supplied to the logic-circuit/CPU unit 200.

When the received signal disappears, the integration circuit executes the discharging operation with the time constant defined by the capacitor R21 and capacitor C20, the gate G1 becomes "off". Thus, since the clock signal is supplied to the logic-circuit/CPU unit 200 only when the received signal is given, current consumption can be reduced.

The present invention permits the same circuit to deal with the intrinsic safety and non-intrinsic safety so as to have versatility.

Also, the present invention permits the logic-circuit/CPU unit to be operated only when a received signal appears. This shortens the preamble signal (circuit-booting signal generated prior to a data signal), thus improving transmission efficiency and leading to reduced power consumption.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A circuit for transmitting signals through a transmission line to each of a plurality of communication terminals connected to said transmission line while power is supplied to the plurality of terminals, said circuit comprising:

a first circuit section including, a first large scale integrated circuit portion and first, second, and third connectors external to said first large scale integrated circuit portion, said first external connector being for connection to a power source external to the first section, a semiconductor switch having a control input connected to said second external connector, and having an output connected to the third external connector, said control input for turning the switch on and off to control conduction of current to said third external connector; and a second circuit section including, a second large scale integrated circuit portion having fourth, fifth, and sixth connectors external to the second large scale integrated circuit portion, a first voltage stabilizing circuit portion having a power source connected to said fourth external connector, a second voltage stabilizing circuit portion having an input connected to said fourth external connector and an output connected to said fifth external connector, a signal receiving circuit having an input connected to the sixth external connector, the first and second large scale integrated circuit portions being electrically coupled to one another by connecting said third and fourth external connectors to one another, the second and fifth external connectors to one another, and the first and sixth external connectors to one another for use in an environment not requiring intrinsic safety, said first and second large scale integrated circuit portions being disconnected from one another by disconnecting from one another said connected external connectors for use in an environment requiring intrinsic safety.

2. The circuit of claim 1 further comprising an excess voltage suppression circuit having outputs connected to the fourth and fifth external connectors of the second integrated circuit portion and an input connected to the sixth external connector of the second integrated circuit portion at times when the first and second large scale integrated circuit portions are disconnected from one another.

3. The circuit of claim 1 wherein the power source includes a rectifying circuit connected to the first external connector with the first and second large scale integrated circuit portions being connected to one another.

4. The circuit of claim 2 wherein the power source includes a rectifying circuit connected to the first external connector when the first and second large scale integrated circuit portions are connected to one another.

5. A circuit for transmitting signals through a transmission line to each of a plurality of communication terminals connected in a multi-drop manner to said transmission line while power is supplied to the plurality of terminals, said circuit comprising:

a first large scale integrated circuit portion electrically connected by external connectors to a second large scale integrated circuit portion, the second integrated circuit portion including a signal reception circuit section having inputs connected to receive transmitted signals and outputs connected to transform the transmitted signals into binary digits having a value, and a gate circuit section connected to store the binary output values from the reception circuit and to supply clock signals to a logic circuit and a processing circuit in response to the stored binary values exceeding a level.

6. The circuit of claim 5 wherein the signal reception circuit comprises a comparator to binary digitize the transmitted signal, and a smoothing circuit connected to smooth the digitized signal to produce a carrier signal.

7. The circuit of claim 6 wherein said gate circuit section comprises a gate and an integration circuit connected to integrate the carrier signal from the smoothing circuit.

* * * * *